(12) United States Patent
Fruchart et al.

(10) Patent No.: US 8,012,452 B2
(45) Date of Patent: Sep. 6, 2011

(54) NANOCRYSTALLINE COMPOSITE FOR STORAGE OF HYDROGEN

(75) Inventors: Daniel Fruchart, Meylan (FR); Patricia De Rango, Gieres (FR); Jean Charbonnier, Grenoble (FR); Salvatore Miraglia, Grenoble (FR); Sophie Rivoirard, Lans En Vercors (FR); Nataliya Skryabina, Perm (RU); Michel Jehan, Fessy (FR)

(73) Assignee: Centre National de la Recherche Scientifique, Paris (FR)

( * ) Notice: Subject to any disclaimer, the term of this patent is extended or adjusted under 35 U.S.C. 154(b) by 101 days.

(21) Appl. No.: 12/298,663

(22) PCT Filed: Apr. 25, 2007

(86) PCT No.: PCT/FR2007/051171
§ 371 (c)(1),
(2), (4) Date: Mar. 31, 2009

(87) PCT Pub. No.: WO2007/125253
PCT Pub. Date: Nov. 8, 2007

(65) Prior Publication Data
US 2009/0278086 A1 Nov. 12, 2009

(30) Foreign Application Priority Data
Apr. 26, 2006 (FR) .................... 06 51478

(51) Int. Cl.
| | |
|---|---|
| C01B 6/00 | (2006.01) |
| C01B 6/04 | (2006.01) |
| C01B 6/02 | (2006.01) |
| C01B 6/24 | (2006.01) |
| C22C 1/04 | (2006.01) |
| C22C 1/00 | (2006.01) |
| C22C 1/02 | (2006.01) |
| C22C 23/00 | (2006.01) |
| B22F 9/00 | (2006.01) |
| B22F 9/02 | (2006.01) |
| B22F 9/04 | (2006.01) |
| B22F 9/16 | (2006.01) |
| C21D 9/00 | (2006.01) |

(52) U.S. Cl. .............. 423/644; 75/330; 75/343; 75/351; 75/352; 75/357; 148/95; 148/420; 148/559; 420/900

(58) Field of Classification Search ........................ None
See application file for complete search history.

(56) References Cited

U.S. PATENT DOCUMENTS
6,656,246 B2 * 12/2003 Kanoya et al. .................. 75/352
(Continued)

FOREIGN PATENT DOCUMENTS
EP 1024918 A1 8/2000
(Continued)

OTHER PUBLICATIONS
Schlapbach, L. et al. "Hydrogen in intermetallic compounds." Topics in applied physics. (1988).v. 63, 67. Berlin, Springer-Verlag.
(Continued)

Primary Examiner — Melvin C Mayes
Assistant Examiner — Colin W Slifka
(74) Attorney, Agent, or Firm — Howard IP Law Group, PC

(57) ABSTRACT

The invention relates to a method for preparation of a material adapted to reversible storage of hydrogen, including steps consisting of providing a first powder of a magnesium-based material, hydrogenating the first powder to convert at least part of the first powder into metal hydrides, mixing the first hydrogenating powder with a second powder additive, the proportion by mass of the second powder in the mix obtained being between 1% and 20% by mass, wherein the additive is formed from an alloy with a centred cubic structure based on titatnium, vanadium and at least one other metal chosen from chromium or manganese, and grinding the mix of first and second powders.

14 Claims, 1 Drawing Sheet

U.S. PATENT DOCUMENTS 7,201,789 B1 * 4/2007 Schulz et al. .................. 75/352

FOREIGN PATENT DOCUMENTS

WO 99/20422 A1 4/1999

OTHER PUBLICATIONS

Hu Y Q et al. "Preparation and hydrogenation characteristics of Mg-30 wt .% Ti37.5V25Cr37.5 composite." Journal of Alloys and Compounds, Elsevier Sequoia, Lausanne, CH. (Jul. 28, 2004) 375:1-2; 265-269.

Khrussanova M et al. "Hydrogen sorption properties of an Mg-Ti-V-Fe nanocomposite obtained by mechanical alloying." Journal of Alloys and Compounds, Elsevier Sequoia, Lausanne, CH. (Aug. 30, 2001) 327:1-2; pp. 230-234.

Grigorova et al. "Addition of 3d-metals with formation of nanocomposites as a way to improve the hydrogenation characteristics of $Mg_2Ni$." Journal of Alloys and Compounds, Elsevier Sequoia, Lausanne, CH. (Apr. 13, 2006) 414:1-2; 298-301.

Liang G et al. "Catalytic effect of transition metals on hydrogen sorption in nanocrystalline ball milled $MgH_2$-Tm (Tm=Ti, V, Mn, Fe and Ni ) systems." Journal of Alloys and Compounds, Elsevier Sequoia, Lausanne CH. (Nov. 15, 1999) 292:1-2; 247-252.

Schlapbach, L. et al. "Hydrogen in intermetallic compounds II: Surface and dynamic properties, applications." Topics in applied physics. (1992). v. 67. Berlin, Springer-Verlag.

International Search Report dated Aug. 13, 2007 from the European Patent Office in a counterpart foreign application PCT/FR2007/051171.

* cited by examiner

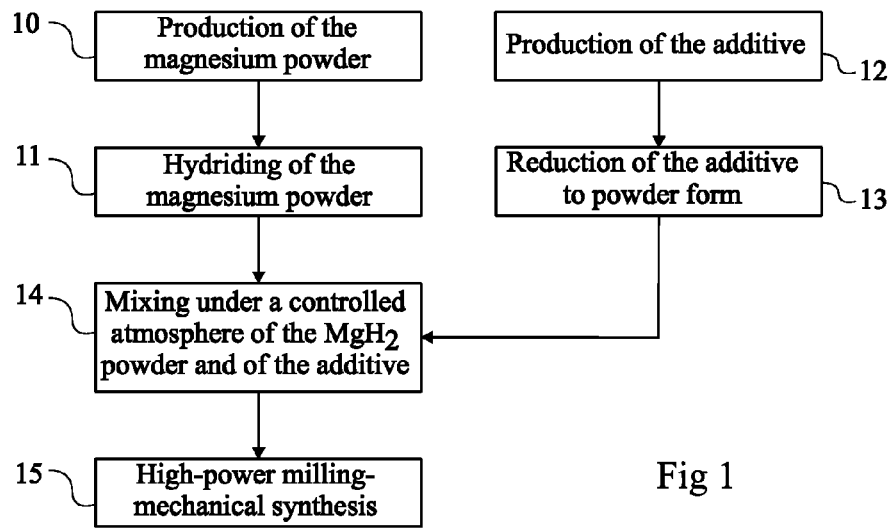
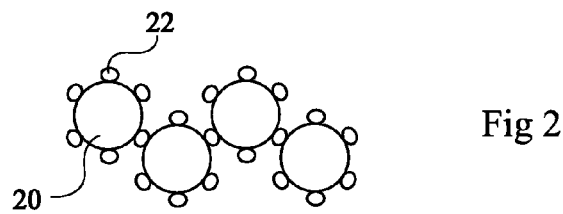
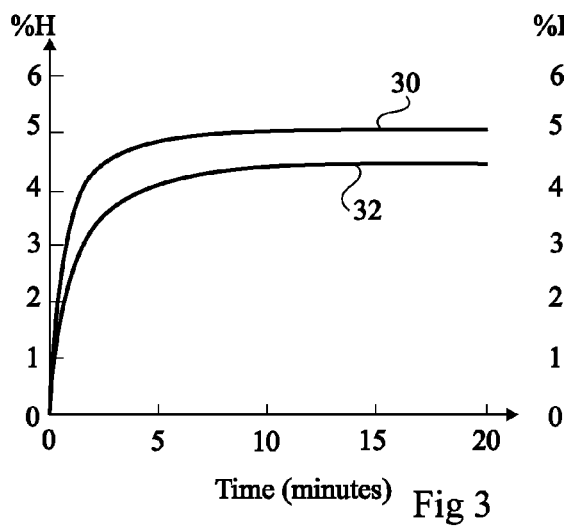
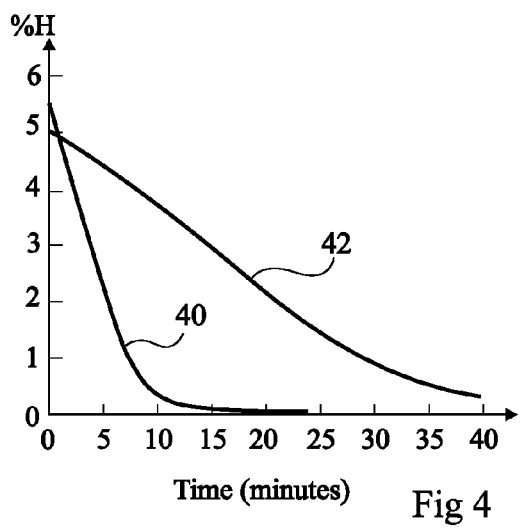

NANOCRYSTALLINE COMPOSITE FOR STORAGE OF HYDROGEN

This application is the national stage application under 35 U.S.C. §371 of the International Application No. PCT/FR2007/051171 and claims the benefit of Int'l. Application No. PCT/FR2007/051171, filed Apr. 25, 2007 and French Application No. 06/51478, filed Apr. 26, 2006, the entire disclosures of which are incorporated herein by reference in their entireties.

FIELD OF THE INVENTION

The present invention relates to materials used for the reversible storage of hydrogen. More specifically, the present invention relates to magnesium-based materials used for the combined storage of hydrogen. The present invention also relates to methods for preparing such materials.

DISCUSSION OF PRIOR ART

Hydrogen ($H_2$) is used in many industrial fields, especially as fuel (for example, in heat engine or fuel cells), or again as a reactant (for example, for hydrogenation reactions). In this context, due to its volume in gaseous state and to its explosibility, it is desirable for hydrogen to be stored in a form ensuring a low bulk and a secure confinement.

A possibility is to store hydrogen in the form of metal hydrides. In this case, the hydrogen to be stored is put in contact with a metal or a metal alloy under pressure and temperature conditions which induce an incorporation of the hydrogen in atomic form into the crystal lattice (absorption reaction or loading reaction). To recover the hydrogen thus stored, lower pressure and/or higher temperature conditions are adopted to favor the reverse reaction (desorption reaction or unloading reaction). A "reversible storage capacity", expressed in proportion by mass, which corresponds to the maximum quantity of hydrogen that can be unloaded by the material once it has been loaded, can be determined. For further details relating to the storage of hydrogen in the form of hydrides, one may refer in particular to "Hydrogen in Intermetallic Compounds I and II", L. Schlapbach, Springer-Verlag, (1988).

Much experimental work is currently being pursued to optimize the performance of metal hydrides for the storage of hydrogen, in particular to obtain a storage material simultaneously having a high reversible storage capacity and absorption and desorption kinetics compatible with an industrial use of the storage material.

Work for example relates to obtaining alloys originating from conventional families of intermetallic compounds, for example, compounds derived from alloys of zirconium-metal $ZrM_2$ (where metal M may be vanadium, chromium, manganese, etc.) or lanthanum-nickel $LaNi_5$, comprising substitution elements enabling to increase the reversible storage capacity without decreasing the absorption/desorption kinetics.

Other work relates to forming new magnesium-based nanocrystalline compounds. A nanocrystalline compound is a material having crystallites with characteristic dimensions close to one nanometer. The reversible storage capacity of pure magnesium is in the order of 7.6%, which substantially corresponds ponds to the highest values that may be obtained with currently-known materials. However, for pure magnesium, acceptable absorption and desorption kinetics are only obtained for temperatures greater than 300° C., which limits the advantages of such a material. By associating magnesium with one or several additive, the obtaining of a nanocrystalline compound having a reversible storage capacity which is not or is only slightly decreased with respect to that of pure magnesium, but having improved hydrogen absorption and desorption kinetics at low temperatures, can be achieved. Generally, the magnesium is said to be "activated" by the additive.

Document EP 1024918 describes a nanocrystalline compound essentially based on magnesium (Mg) and on another minority element selected, for example, from vanadium (V), titanium (Ti), or niobium (Nb). Vanadium is currently the additive which provides one of the best compromises between the absorption/desorption kinetics and the reversible storage capacity. Such a material has improved hydrogen absorption and desorption kinetics with respect to pure magnesium. It would however be desirable to obtain a material having improved absorption and desorption kinetics with an equivalent or even a greater reversible storage capacity. Further, vanadium is a relatively expensive material.

SUMMARY OF THE INVENTION

The present invention aims at obtaining a compound material for the storage of hydrogen, which is based on magnesium and has improved absorption and desorption kinetics and a reversible storage capacity which is at least equivalent to that of known magnesium-based hydrogen storage materials.

The present invention also aims at a method for manufacturing such a magnesium-based hydrogen storage material which is compatible with a manufacturing method at an industrial scale.

According to another aim of the present invention, the method is simple and likely to be implemented conventionally, in the same way as for activated magnesium compound materials.

To achieve all or part of these aims as well as others, the present invention provides a method for preparing a material adapted to the reversible storage of hydrogen, comprising the successively performed steps of providing a first powder of a magnesium-based material; hydrogenating the first powder to convert at least part of the first powder into metal hydrides; mixing the first hydrogenated powder with a second powder of an additive, the proportion by mass of the second powder in the resulting mixture ranging from between 1 and 20% by mass, said additive being formed from an alloy (a1) of body-centered structure, based on titanium, on vanadium, and on at least one other metal selected from among chromium and manganese; and milling the mixture of the first and second powders.

The present invention also provides a compound metallic material, intended for the reversible storage of hydrogen, obtained according to the previously-described method, comprising first particles of a magnesium-based material; and second particles at least partly distributed at the surface of the first particles and comprising at least one phase based on titanium, vanadium, and on at least one metal selected from among chromium and manganese and the alloys thereof.

According to an embodiment of the invention, at least some of the second particles comprise a majority phase based on titanium, vanadium, and at least one metal selected from among chromium and manganese and the alloys thereof; and at least one intergranular phase based on a first metal selected from among zirconium, niobium, molybdenum, hafnium, tantalum, tungsten, and an alloy of these metals; and on a second metal, selected from among nickel, copper, and an alloy of these metals.

BRIEF DESCRIPTION OF THE DRAWINGS

The foregoing and other objects, features, and advantages of the present invention will be discussed in detail in the following non-limiting description of specific examples in connection with the accompanying drawings, among which:

FIG. 1 illustrates the steps of an example of a method for preparing a magnesium-based hydrogen storage material according to the invention;

FIG. 2 schematically shows the structure of an example of a hydrogen storage material according to the invention;

FIG. 3 shows curves of the loading of an example of a hydrogen storage material according to the invention and of a conventional hydrogen storage material; and FIG. 4 shows curves of the unloading of an example of a hydrogen storage material according to the invention and of a conventional hydrogen storage material.

DETAILED DESCRIPTION

The present invention aims at using, as a hydrogen storage material, a magnesium-based material activated by a specific additive, the proportion of additive ranging from between 1% and 20% by mass, for example, approximately 5% by mass. The storage material is obtained from a powder of the magnesium-based material and from a powder of the additive. The storage material may be mixed with a carrier to make its use and/or its manipulation easier. As an example, the carrier may correspond to expanded graphite, to a carbon-based nano-compound, or to a metal foam.

The magnesium-based material may be pure magnesium or a magnesium-based alloy, for example, a magnesium and nickel alloy ($Mg_2Ni$).

According to a first embodiment of the invention, the additive corresponds to an alloy (a1) of body-centered crystal structure, based on titanium (Ti), on vanadium (V), and on another material preferentially selected from among chromium (Cr) and/or manganese (Mn). The alloy (a1) may be of single-phase type (alloy of defined intermetallic compound type) or of multiphase type. Of course, the alloy (a1) may contain other elements in minor proportions.

According to the first embodiment of the invention, the alloy (a1) complies with the following general formula:

$$Ti_a V_b M_c M'_d$$

where

M designates chromium, manganese, or a chromium and manganese alloy;

M' designates a metal or an alloy of metals, other than Ti, V, Cr, or Mn, for example selected from among iron, cobalt, nickel, or mixtures of these metals;

a is a number in the range 0.05 to 2.5, typically between 0.1 and 2, for example, between 0.2 and 1.5;

b is a number in the range 0.05 to 2.9, typically between 0.1 and 2.2;

c is a number in the range 0.05 to 2.9, typically between 0.5 and 2.5; and d, which may be zero, is a number in the range 0 to 0.5, this number being preferably smaller than 0.2, for example, smaller than 0.1, sum (a+b+c+d) being equal to 3.

More specifically, it may be advantageous to use an alloy (a1) complying with the following general formula:

$$Ti_x V_y Cr_{3-(x+y)}$$

where:

x is a number in the range 0.1 to 1, typically greater than or equal to 0.2; and y is a number in the range 0.1 to 2.5, sum (x+y) being typically greater than 1.5, and generally smaller than 2.9.

The alloys complying with the following general formulas may be mentioned as a non-limiting example of alloys (a1) which are particularly well adapted to be used as additive:

$TiV_{0.8}Cr_{1.2}$
$Ti_{0.9}V_{0.7}Cr_{1.4}$
$Ti_{0.833}V_{0.826}Cr_{1.334}$
$Ti_{0.7}V_{0.9}Cr_{1.4}$
$Ti_{0.66}VCr_{1.33}$
$Ti_{0.5}V_{1.9}Cr_{0.6}$
$Ti_{0.5}V_2Cr_{0.5}$
$Ti_{0.25}V_{2.5}Cr_{0.25}$

FIG. 1 schematically shows the steps of an example of a method for preparing the hydrogen storage material according to the invention.

At step 10, a powder of the magnesium-based material is formed. The magnesium-based material is, for example, magnesium generated by thermal reduction processes (PIDGEON) or by electrolysis of magnesium chloride. It may also be redistilled. The magnesium powder may be obtained from milled magnesium ingots. The average diameter of the obtained magnesium particles is in the range 10 μm to 200 μm, preferably between 10 μm and 100 μm, for example, on the order of 40 μm.

At step 11, the magnesium powder is hydrogenated. The hydrogenation step is for example carried out under a hydrogen atmosphere at a pressure of a few tens of bars, for example, in the order of 30 bars (30*10^5 Pa) and at a temperature of a few hundred degrees, for example, greater than 400° C., for several hours. A powder comprising 99% by weight of magnesium hydride, the residual mass corresponding to metal magnesium and to magnesium oxide, is obtained at the end of step 11. The method carries on at step 14, steps 12 and 13 described hereafter being carried out independently from steps 10 and 11.

At step 12, the additive powder is formed, separately from the magnesium powder.

According to the first example of additive according to the invention, the alloy (a1) may be prepared by fusion of a mixture comprising, among others, titanium, vanadium, and chromium and/or manganese, for example at temperatures in the order of 1300° C. to 1700° C. The fusion may be performed in an induction furnace, or any other furnace enabling a fusion at high temperature, under a neutral gas atmosphere (argon, for example), in particular to avoid the alloy being oxidized.

According to a second embodiment of the invention, the additive is obtained by co-fusion followed by a cooling of the following metal mixtures, or by carrying out a mechanosynthesis step by co-milling of the following metal mixtures:

a first alloy or metal mixture (m1) which may correspond to the first alloy (a1) or to a mixture of the metals forming said alloy (a1), in the proportions of said alloy, these metals being present in the mixture as simple metals (non-alloyed) and/or as metal alloys; and a second alloy or mixture (m2), which is an alloy (a2) comprising:

from 38 to 42 mol % of a first metal $M^1$ selected from among zirconium (Zr), niobium (Nb), molybdenum (Mo), hafnium (Hf), tantalum (Ta), tungsten (W), and mixtures of these metals; and from 56 to 60 mol % of a second metal $M^2$ selected from among nickel (Ni), copper (Cu), and alloys or mixtures of these metals; or a mixture of the metals forming said alloy (a2), in the proportions of said alloy, these metals being present in the mixture as simple metals (non alloyed) and/or as metal alloys;

with a mass ratio (m2)/(m1+m2) ranging from 0.1% by mass to 20% by mass in the co-fusion or mechanosynthesis step. Mass ratio (m2)/(m1+m2) is preferably in the range 0.5% by mass to 20% by mass, preferably between 0.5% by mass and 15% by mass and, preferably, between 1% by mass and 10% by mass.

According to a specific embodiment, the second alloy (a2) complies with the following formula:

$$M^1_{7-m}M^2_{10-n}M^3_p$$

where $M^1$ designates a first metal, selected from among zirconium (Zr), niobium (Nb), molybdenum (Mo), hafnium (Hf), tantalum (Ta), tungsten (W), and mixtures of these metals, $M^1$ preferably being Zr;

$M^2$ designates a second metal, selected from among nickel (Ni), copper (Cu), and mixtures of these metals, $M^2$ preferably designating Ni;

$M^3$ designates a metal or a mixture of metals, which may be present in the alloy, different from $M^1$ and $M^2$;

m is a positive, negative, or null number in the range −0.1 to +0.1;

n is a positive, negative, or null number in the range −0.1 to +0.1; and p is a positive or null number in the range 0 to 0.2.

Preferentially still, the second alloy (a2) complies with the following formula:

$$M^1_7 M^2_{10}$$

where $M^1$ and $M^2$ are as previously defined.

The second alloy (a2) for example corresponds to formula $Zr_7Ni_{10}$.

Whatever its composition, the second alloy (a2) may be prepared similarly to the first alloy (a1), typically by co-fusion of its constitutive elements, generally at between 1100° C. and 1500° C., for example, by induction, advantageously under a neutral gas atmosphere, such as argon, in particular to avoid the alloy oxidizing. It may also be prepared by mechanosynthesis by co-milling.

An example of a method for manufacturing the additive is described in further detail in Patent application FR0601615 filed in the name of CNRS.

The additive according to the second embodiment has a very specific dual— or multiphase structure, which is generally fine and homogeneous, which comprises:

a majority phase based on titanium, vanadium, and chromium and/or manganese, scattered in the form of grains typically having dimensions in the range 10 to 100 microns, in particular between 20 and 80 microns, for example, between 40 and 50 microns; and at least one intergranular phase based on a first metal selected from among zirconium, niobium, molybdenum, hafnium, tantalum, tungsten, or a mixture of these metals; and on a second metal, selected from among nickel, copper, or a mixture of these metals.

In this specific multiphase compound material formed from phases (a1) and (a2), the majority phase grains are scattered within an intergranular medium comprising one or several phases. Thus, the intergranular phase(s) form(s) walls between the scattered grains. These walls generally have an average thickness in the order of a few microns (typically, between 1 and 5 microns).

In this multiphase material, the majority phase (or "intragranular" phase) generally has a composition which is relatively close to that of the initial alloy (a1). The intergranular phase(s) are most often based on the materials forming the second alloy (a2). However, it should be noted that the co-fusion may induce phenomena of diffusion of some atoms between the alloys, whereby the compositions of the intragranular and intergranular phases may significantly diverge with respect to the initial compositions of the first and second alloys (a1) and (a2). Similarly, the crystal structure of the intragranular and intergranular phases may differ from those of the original alloys. However, the majority intragranular phase of the compound material systematically keeps the body-centered crystal structure of the original alloy (a1). The method carries on at step 13.

At step 13, a powder is formed from the additive. The powder of the additive according to the first or second embodiment may be obtained by hydrogenation of the metallic material obtained at the fusion step, enabling the conversion of at least part of the alloys which are present into metal hydrides, and directly resulting in a breakdown of the material in the form of a powder. The particles of the additive powder for example have an average diameter in the order of from 1 μm to 500 μm, for example, approximately 40 μm. According to a variation, the additive powder may be obtained by milling of the material obtained after the co-fusion step. When step 12 corresponds to a step of mechanosynthesis by co-milling, the additive is directly obtained in the form of a powder. Steps 12 and 13 then are merged together. The method carries on at step 14.

At step 14, the magnesium hydride powder, or the powder of the magnesium-based phase hydride, is mixed with the additive powder. The method carries on at step 15.

At step 15, the particles of the magnesium hydride powder or of the powder of the magnesium-based phase hydride are milled together with the additive powder. The milling is carried out under a neutral or reducing atmosphere, for example, a hydrogenated argon atmosphere at atmospheric pressure or at slightly higher pressure (up to 0.2 MPa). The milling may be performed at room temperature or at a slightly higher temperature by means of a ball mill system, with or without blades. As an example, the milling is performed for 4 hours in a high-power mill usually used for mechanosynthesis. The mill is cooled down.

To perform a hydrogen loading operation based on the material obtained at step 15, it is necessary to provide a prior step of total dehydrogenation of the powder material obtained at step 15. Such a step enables a desorption of the hydrogen stored in the magnesium particles at step 11 (and possibly in the additive particles at step 14). The material finally obtained can then be used for the storage of hydrogen.

FIG. 2 very schematically shows the structure of the storage material obtained at the end of the previously-described preparation method, including the final dehydrogenation step. The presence of magnesium or of magnesium-based particles 20, which for example have an average diameter in the range 1 to 20 micrometers, preferably between 1 and 10 micrometers, can be observed. Particles 22 of the additive are distributed around each magnesium particle 20. Additive particles 22 for example have an average diameter in the range 20 nanometers to 1 μm. The average diameter of the magnesium particles of the final product is smaller than the average diameter of the particles of the magnesium powder formed at step 10. This is due to the fact that the present invention provides a step of hydrogenation (step 11) of the magnesium powder before mixing it with the additive powder (step 14). Magnesium hydride being a more fragile material than pure magnesium, milling step 15 causes a breakdown of the magnesium hydride particles. Milling step 15 also causes a decrease in the average diameter of the additive particles with respect to the average diameter of the particles of the additive powder formed at step 13.

FIG. 3 shows a curve 30 of the variation of the quantity of hydrogen (in proportion by mass) stored in the storage material according to the invention in a storage material loading operation. The storage material corresponds to a metal compound formed of a magnesium-based material and of the additive according to the second embodiment of the present invention, the proportion by mass of additive being 10% by mass. The additive has been formed from alloy (a1) $Ti_{0.25}V_{2.5}Cr_{0.25}$ and from alloy (a2) $Zr_7Ni_{10}$, the mass ratio (m2)/(m1+m2) being 4%. For the preparation of the storage material, the hydrogenation of the magnesium powder of step 11 has been carried out under a hydrogen atmosphere at a pressure of $30*10^5$ Pa (30 bars) and a 440° C. temperature for 12 hours. As a comparison, curve 32 shows the variation of the hydrogen quantity contained in a reference storage material based on magnesium activated by vanadium only, the mass proportion of the vanadium being 10% by mass. For a loading operation performed at a 240° C. temperature under a hydrogen pressure of $10*10^5$ Pa (10 bars), the hydrogen mass storage capacity is, after 20 minutes, approximately 5.2% for the storage material according to the invention and approximately 4.5% for the comparison material. The present invention thus provides a storage material having a reversible storage capacity which is equivalent to or even greater than that obtained for a conventional storage material based on magnesium activated, for example, by vanadium. The loading kinetics of the material prepared according to the present invention is greater than that conventional vanadium-activated storage materials.

FIG. 4 shows a curve 40 of the variation of the hydrogen quantity contained in the storage material according to the invention previously described in relation with FIG. 3 during an unloading operation. As a comparison, curve 42 shows the variation of the hydrogen quantity contained in the magnesium-based storage material activated by vanadium previously described in relation with FIG. 3. The unloading operation has been carried out at a temperature of 260° C. under a 15-kPa hydrogen pressure. The desorption speed of the hydrogen contained in the storage material according to the invention is greater than that obtained for a conventional magnesium-based storage material activated by vanadium.

The present invention provides a storage material having improved loading and unloading kinetics with respect to a conventional magnesium-based storage material activated by vanadium. Further, the present invention provides a reversible storage capacity which is equivalent to or even greater than that of a conventional magnesium-based storage material activated by an additive. Further, the present invention enables the cost of the storage material to be decreased. Indeed, vanadium is a relatively expensive material. Further, the method for preparing the storage material according to the present invention implements metal fusion, milling, and hydrogenation steps, which are well-known steps of methods for processing materials. The preparation method according to the invention can thus easily be implemented at an industrial scale. Finally, in an unloading operation, high-purity hydrogen is obtained.

The invention claimed is:

1. A method for preparing a material adapted for reversible storage of hydrogen, comprising the successively performed steps of:

(a) providing a first powder of a magnesium-based material;
(b) hydrogenating the first powder to convert at least part of the first powder into metal hydrides;
(c) mixing the first hydrogenated powder with a second powder of an additive, the proportion by mass of the second powder in the resulting mixture ranging from between 1 and 20% by mass; and
(d) milling the mixture of the first and second powders,
the method further comprising forming said additive, to be mixed with said first hydrogenated powder, by co-fusion followed by a cooling of a first metal mixture (m1) and a second metal mixture (m2):
said first metal mixture (m1) comprising either:
  a first metal alloy (a1), of body-centered crystal structure, based on titanium (Ti), on vanadium (V), and on another metal M selected from among chromium (Cr), manganese (Mn), and alloys of these metals; or
  a mixture of the metals forming said first metal alloy (a1), in the proportions of said first metal alloy (a1), these metals being present in the mixture as simple metals or as metal alloys; and
said second metal mixture (m2) comprising either:
  a second metal alloy (a2) comprising:
    from 38 to 42 mol % of a first metal selected from among zirconium (Zr), niobium (Nb), molybdenum (Mo), hafnium (Hf), tantalum (Ta), tungsten (W), and mixtures of these metals; and
    from 56 to 60 mol % of a second metal selected from among nickel (Ni), copper (Cu), and alloys of these metals; or
  a mixture of the metals forming said second metal alloy (a2), in the proportions of said second metal alloy (a2), these metals being present in the mixture as simple metals or as metal alloys;
wherein said first and second metal mixtures (m1, m2) have a mass ratio (m2)/(m1+m2) ranging from 0.1% to 20% by mass in the co-fusion step,
wherein the additive has a majority phase based on titanium, vanadium, and chromium and/or manganese, scattered in the form of grains, and at least one intergranular phase based on said first and second metals of said second metal mixture (m2).

2. The method of claim 1, wherein the first metal alloy (a1) complies with the following general formula:

$Ti_aV_bM_cM'_d$ where
M designates chromium, manganese, or a chromium and manganese alloy;
M' designates a metal or an alloy of metals, other than Ti, V, Cr, or Mn, selected from among iron, cobalt, nickel, and mixtures of these metals;
a is a number in the range 0.05 to 2.5;
b is a number in the range 0.05 to 2.9;
c is a number in the range 0.05 to 2.9; and
d is a number in the range 0 to 0.5, sum (a+b+c+d) being equal to 3.

3. The method of claim 1, wherein the second metal alloy (a2) complies with the following formula:

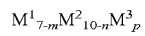

$M^1_{7-m}M^2_{10-n}M^3_p$ where:
$M^1$ designates a first metal, selected from among zirconium (Zr), niobium (Nb), molybdenum (Mo), hafnium (Hf), tantalum (Ta), tungsten (W), and mixtures of these metals;

M² designates a second metal, selected from among nickel (Ni), copper (Cu), and mixtures of these metals;

M³ designates a metal or a mixture of metals, which may be present in the alloy, different from M¹ and M²;

m is a positive, negative, or null number in the range −0.1 to +0.1;

n is a positive, negative, or null number in the range −0.1 to +0.1; and p is a positive or null number in the range 0 to 0.2.

4. The method of claim 1, wherein the second metal alloy (a2) complies with the following formula:

$$Zr_7Ni_{10}.$$

5. The method of claim 1, wherein the mass ratio (m2)/(m1+m2) is in the range 0.5 to 20% by mass.

6. The method of claim 1, wherein, at step (a), the particles of the first powder have an average diameter in the range 10 to 200 μm, and wherein the particles of the first powder have, at the end of step (d), an average diameter in the range 1 to 20 μm.

7. The method material of claim 1, wherein the average diameter of the particles of the first powder is in the range 1 to 20 μm and wherein the average diameter of the particles of the second powder is in the range 20 nm to 1 μm.

8. A method for preparing a material adapted for reversible storage of hydrogen, comprising the successively performed steps of:

(a) providing a first powder of a magnesium-based material;

(b) hydrogenating the first powder to convert at least part of the first powder into metal hydrides;

(c) mixing the first hydrogenated powder with a second powder of an additive, the proportion by mass of the second powder in the resulting mixture ranging from between 1 and 20% by mass; and (d) milling the mixture of the first and second powders, the method further comprising forming said additive, to be mixed with said first hydrogenated powder, by mechanosynthesis by co-milling of a first metal mixture (m1) and a second metal mixture (m2):

said first metal mixture (m1) comprising either:

a first metal alloy (a1), of body-centered crystal structure, based on titanium (Ti), on vanadium (V), and on another metal M selected from among chromium (Cr), manganese (Mn), and alloys of these metals; or a mixture of the metals forming said first metal alloy (a1), in the proportions of said first metal alloy (a1), these metals being present in the mixture as simple metals or as metal alloys; and said second metal mixture (m2) comprising either:

a second metal alloy (a2) comprising:

from 38 to 42 mol % of a first metal selected from among zirconium (Zr), niobium (Nb), molybdenum (Mo), hafnium (Hf), tantalum (Ta), tungsten (W), and mixtures of these metals; and from 56 to 60 mol % of a second metal selected from among nickel (Ni), copper (Cu), and alloys of these metals; or a mixture of the metals forming said second metal alloy (a2), in the proportions of said second metal alloy (a2), these metals being present in the mixture as simple metals or as metal alloys;

wherein said first and second metal mixtures (m1, m2) have a mass ratio (m2)/(m1+m2) ranging from 0.1% to 20% by mass in the mechanosynthesis step, wherein the additive has a majority phase based on titanium, vanadium, and chromium and/or manganese, scattered in the form of grains, and at least one intergranular phase based on said first and second metals of said second metal mixture (m2).

9. The method of claim 8, wherein the first metal alloy (a1) complies with the following general formula:

$$Ti_aV_bM_cM'_d$$

where

M designates chromium, manganese, or a chromium and manganese alloy;

M' designates a metal or an alloy of metals, other than Ti, V, Cr, or Mn, selected from among iron, cobalt, nickel, and mixtures of these metals;

a is a number in the range 0.05 to 2.5;

b is a number in the range 0.05 to 2.9;

c is a number in the range 0.05 to 2.9; and d is a number in the range 0 to 0.5, sum (a+b+c+d) being equal to 3.

10. The method of claim 8, wherein the second metal alloy (a2) complies with the following formula:

$$M^1{}_{7-m}M^2{}_{10-n}M^3{}_p$$

where:

M¹ designates a first metal, selected from among zirconium (Zr), niobium (Nb), molybdenum (Mo), hafnium (Hf), tantalum (Ta), tungsten (W), and mixtures of these metals;

M² designates a second metal, selected from among nickel (Ni), copper (Cu), and mixtures of these metals;

M³ designates a metal or a mixture of metals, which may be present in the alloy, different from M¹ and M²;

m is a positive, negative, or null number in the range −0.1 to +0.1;

n is a positive, negative, or null number in the range −0.1 to +0.1; and p is a positive or null number in the range 0 to 0.2.

11. The method of claim 8, wherein the second metal alloy (a2) complies with the following formula:

$$Zr_7Ni_{10}.$$

12. The method of claim 8, wherein the mass ratio (m2)/(m1+m2) is in the range 0.5 to 20% by mass.

13. The method of claim 8, wherein, at step (a), the particles of the first powder have an average diameter in the range 10 to 200 μm, and wherein the particles of the first powder have, at the end of step (d), an average diameter in the range 1 to 20 μm.

14. The method of claim 8 wherein the average diameter of the particles of the first powder is in the range 1 to 20 μm and wherein the average diameter of the particles of the second powder is in the range 20 nm to 1 μm.

* * * * *